United States Patent
Emralino et al.

(10) Patent No.: US 9,454,305 B1
(45) Date of Patent: Sep. 27, 2016

(54) METHOD AND SYSTEM FOR MANAGING STORAGE RESERVATION

(71) Applicant: QLOGIC, Corporation, Aliso Viejo, CA (US)

(72) Inventors: Normin A. Emralino, Huntington Beach, CA (US); Anurag Verma, Pune (IN); Ajmer Singh, Rancho Santa Margarita, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 118 days.

(21) Appl. No.: 14/165,100

(22) Filed: Jan. 27, 2014

(51) Int. Cl.
*G06F 13/00* (2006.01)
*G06F 3/06* (2006.01)

(52) U.S. Cl.
CPC .......... *G06F 3/0604* (2013.01); *G06F 3/0658* (2013.01); *G06F 3/0689* (2013.01)

(58) Field of Classification Search
None
See application file for complete search history.

(56) References Cited

U.S. PATENT DOCUMENTS

| | | | |
|---|---|---|---|
| 5,689,678 A | 11/1997 | Stallmo et al. | |
| 6,219,676 B1 | 4/2001 | Reiner | |
| 6,467,022 B1 | 10/2002 | Buckland et al. | |
| 6,484,229 B1 | 11/2002 | Ichikawa et al. | |
| 6,502,205 B1 | 12/2002 | Yanai et al. | |
| 6,745,324 B1 | 6/2004 | Skazinski et al. | |
| 6,799,283 B1 | 9/2004 | Tamai et al. | |
| 6,922,754 B2 | 7/2005 | Liu et al. | |
| 7,013,336 B1 | 3/2006 | King | |
| 7,249,221 B2 | 7/2007 | Shimada | |
| 7,272,674 B1 | 9/2007 | Nandi et al. | |
| 7,356,573 B2 | 4/2008 | Sharma et al. | |
| 7,506,124 B2 | 3/2009 | Sharma et al. | |
| 7,617,289 B2 | 11/2009 | Srinivasan et al. | |
| 7,631,155 B1 | 12/2009 | Bono et al. | |
| 7,685,269 B1 | 3/2010 | Thrasher et al. | |
| 7,865,663 B1 | 1/2011 | Nelson et al. | |
| 7,873,619 B1 | 1/2011 | Faibish et al. | |
| 8,099,499 B2 | 1/2012 | Oeda | |
| 8,510,265 B1 | 8/2013 | Boone et al. | |
| 8,555,022 B1 | 10/2013 | Edwards et al. | |
| 8,589,550 B1 | 11/2013 | Faibish et al. | |
| 8,626,967 B1 | 1/2014 | Naik et al. | |
| 8,639,872 B1 | 1/2014 | Boyle et al. | |

(Continued)

OTHER PUBLICATIONS

"Notice of Allowance from USPTO dated Mar. 30, 2016 for U.S. Appl. No. 13/790,471".

(Continued)

*Primary Examiner* — Brian Peugh
*Assistant Examiner* — Dustin Bone
(74) *Attorney, Agent, or Firm* — Klein, O'Neill & Singh, LLP

(57) ABSTRACT

Methods and systems for managing logical storage object reservation requests are provided. A controller of a storage array having a storage device for storing information on behalf of the logical storage object communicates with a first adapter via a network connection. The controller grants ownership of the logical storage object to the first adapter by the controller. A second adapter that interfaces with the first adapter is notified by the first adapter regarding the granted ownership. The second adapter is configured to send a request for reserving the logical storage object to the first adapter, where the second adapter sends the request on behalf of an application for reading, writing or both reading and writing at the storage space using the logical storage object. The first adapter receives and processes the request.

21 Claims, 7 Drawing Sheets

(56) References Cited

U.S. PATENT DOCUMENTS

| | | |
|---|---|---|
| 8,805,951 B1 | 8/2014 | Faibish et al. |
| 8,863,145 B2 | 10/2014 | Watanabe et al. |
| 9,009,444 B1* | 4/2015 | Derbeko ............ G06F 11/0793 711/113 |
| 9,172,586 B1 | 10/2015 | Shah et al. |
| 9,232,005 B1 | 1/2016 | Shah et al. |
| 2003/0135782 A1 | 7/2003 | Matsunami et al. |
| 2003/0140209 A1 | 7/2003 | Testardi |
| 2003/0172149 A1 | 9/2003 | Edsall et al. |
| 2005/0027798 A1 | 2/2005 | Chiou et al. |
| 2005/0210314 A1 | 9/2005 | Iguchi |
| 2006/0031653 A1 | 2/2006 | Todd et al. |
| 2006/0075190 A1 | 4/2006 | Higaki et al. |
| 2006/0095709 A1 | 5/2006 | Achiwa |
| 2006/0218362 A1 | 9/2006 | McManis |
| 2006/0282618 A1 | 12/2006 | Thompson et al. |
| 2007/0016681 A1 | 1/2007 | Suzuki et al. |
| 2007/0028073 A1 | 2/2007 | Takayama et al. |
| 2008/0071984 A1 | 3/2008 | Araki et al. |
| 2008/0104259 A1 | 5/2008 | LeFevre et al. |
| 2008/0114961 A1 | 5/2008 | Ramaswamy et al. |
| 2008/0270700 A1 | 10/2008 | Rao et al. |
| 2008/0270727 A1 | 10/2008 | Jacobson et al. |
| 2009/0055507 A1 | 2/2009 | Oeda |
| 2009/0064161 A1 | 3/2009 | Hosouchi et al. |
| 2009/0187713 A1 | 7/2009 | Zedlewski et al. |
| 2009/0210620 A1 | 8/2009 | Jibbe et al. |
| 2009/0248975 A1 | 10/2009 | Daud et al. |
| 2009/0265507 A1 | 10/2009 | Jibbe et al. |
| 2010/0281230 A1 | 11/2010 | Rabii et al. |
| 2011/0087833 A1 | 4/2011 | Jones |
| 2011/0138136 A1 | 6/2011 | Shitomi et al. |
| 2011/0191534 A1 | 8/2011 | Ash et al. |
| 2011/0197046 A1 | 8/2011 | Chiu et al. |
| 2011/0238672 A1 | 9/2011 | Agarwala et al. |
| 2011/0276746 A1 | 11/2011 | Pruthi et al. |
| 2011/0289279 A1 | 11/2011 | Sonnier et al. |
| 2012/0005668 A1 | 1/2012 | Serizawa et al. |
| 2012/0089786 A1 | 4/2012 | Pruthi |
| 2012/0102137 A1 | 4/2012 | Pruthi et al. |
| 2012/0137059 A1 | 5/2012 | Yang et al. |
| 2012/0159053 A1 | 6/2012 | Kano et al. |
| 2012/0221729 A1 | 8/2012 | Hara et al. |
| 2012/0254504 A1 | 10/2012 | Syu et al. |
| 2012/0254509 A1 | 10/2012 | Cleveland et al. |
| 2012/0331222 A1 | 12/2012 | Jibbe et al. |
| 2013/0042048 A1 | 2/2013 | Kutergin et al. |
| 2013/0080715 A1 | 3/2013 | Mori et al. |
| 2013/0111474 A1 | 5/2013 | Agarwal et al. |
| 2013/0132673 A1 | 5/2013 | Saito et al. |
| 2013/0198457 A1 | 8/2013 | Kobayashi et al. |
| 2013/0198459 A1 | 8/2013 | Joshi |
| 2013/0238851 A1 | 9/2013 | Chang et al. |
| 2013/0282982 A1 | 10/2013 | Hayashi |
| 2013/0290571 A1 | 10/2013 | Rizzo et al. |
| 2013/0332612 A1 | 12/2013 | Cai et al. |
| 2013/0339600 A1 | 12/2013 | Shah |
| 2014/0013027 A1 | 1/2014 | Jannyavula Venkata et al. |
| 2014/0122778 A1 | 5/2014 | O'Brien |
| 2014/0129521 A1 | 5/2014 | Marsden |
| 2014/0244935 A1 | 8/2014 | Ezra et al. |
| 2014/0258533 A1 | 9/2014 | Antony |
| 2015/0058547 A1 | 2/2015 | Thatcher et al. |
| 2015/0134920 A1* | 5/2015 | Anderson ............ G06F 3/0658 711/154 |
| 2015/0143023 A1 | 5/2015 | Rostoker et al. |

OTHER PUBLICATIONS

"International Search Report on corresponding PCT application (PCT/US2013/042918) from International Searching Authority (USPTO) dated Nov. 27, 2013".
"Written Opinion on corresponding PCT application (PCT/US2013/042918) from International Searching Authority (USPTO) dated Nov. 27, 2013".
"Office Action from USPTO dated Dec. 24, 2014 for U.S. Appl. No. 13/790,395".
"International Preliminary Report on Patentability on corresponding PCT application (PCT/US2013/042918) from International Bureau (WIPO) dated Dec. 16, 2014".
"Office Action from USPTO dated Feb. 20, 2015 for U.S. Appl. No. 13/790,894".
"Office Action from USPTO dated Mar. 3, 2015 for U.S. Appl. No. 13/790,800".
"Office Action from USPTO dated Mar. 11, 2015 for U.S. Appl. No. 13/790,846".
"Office Action from USPTO dated Mar. 27, 2015 for U.S. Appl. No. 13/790,471".
"Office Action from USPTO dated May 7, 2015 for U.S. Appl. No. 13/790,499".
"QLOGIC 10000 Series QLogic FabricCache Adapter Data Sheet", (Nov. 2013).
"Notice of Allowance from USPTO dated Aug. 14, 2015 for U.S. Appl. No. 13/790,846".
"Final Office Action from dated Aug. 18, 2015 for U.S. Appl. No. 13/790,395".
"Notice of Allowance from USPTO dated Sep. 23, 2015 for U.S. Appl. No. 14/088,082".
"Final Office Action from USPTO dated Sep. 24, 2015 for U.S. Appl. No. 13/790,800".
"Final Office Action from USPTO dated Oct. 8, 2015 for U.S. Appl. No. 13/790,471".
"Final Office Action from USPTO dated Sep. 15, 2015 for U.S. Appl. No. 13/790,894".
"Final Office Action from USPTO dated Oct. 23, 2015 for U.S. Appl. No. 13/790,499".
"Notice of Allowance from USPTO dated Nov. 25, 2015 for U.S. Appl. No. 13/790,846".
"Office Action from USPTO dated Dec. 21, 2015 for U.S. Appl. No. 14/302,706".
"Notice of Allowance from USPTO dated Jan. 15, 2016 for U.S. Appl. No. 13/790,395".
"Extended European Search Report from EPO dated Jan. 28, 2016 for EP Application No. 13803862.5".
"Office Action from USPTO dated Feb. 26, 2016 for U.S. Appl. No. 13/790,499".
"Notice of Allowance from USPTO dated Mar. 1, 2016 for U.S. Appl. No. 13/790,471".
"Office Action from USPTO dated Feb. 24, 2015 for U.S. Appl. No. 13/902,427".
"VMWare Storage Best Practices", VMWare, (Apr. 2011), https://www.vmware.com/files/pdf/support/landing_pages/Virtual-Support-Day-Storage-Best-Practices-June-2012.pdf.
"Notice of Allowance from USPTO dated Aug. 26, 2015 for U.S. Appl. No. 13/902,427".
"Office Action from USPTO dated Dec. 4, 2015 for U.S. Appl. No. 14/193,691".
"Notice of Allowance from USPTO dated Jan. 29, 2016 for U.S. Appl. No. 14/470,309".
"Notice of Allowance from USPTO dated Mar. 1, 2016 for U.S. Appl. No. 14/470,337".
"Office Action from USPTO dated Mar. 2, 2016 for U.S. Appl. No. 14/593,898".
"Office Action from USPTO dated Mar. 9, 2016 for U.S. Appl. No. 14/312,130".
"Notice of Allowance from USPTO dated Apr. 26, 2016 for U.S. Appl. No. 14/498,580".
"Office Action from USPTO dated May 6, 2016 for U.S. Appl. No. 14/339,086".
"Notice of Allowance from USPTO dated May 27, 2016 for U.S. Appl. No. 14/302,706".
"Office Action from USPTO dated Jun. 6, 2016 for U.S. Appl. No. 13/790,894".
"Office Action from USPTO dated Jun. 6, 2016 for U.S. Appl. No. 13/790,800".

(56) References Cited

OTHER PUBLICATIONS

"Final Office Action from USPTO dated Jun. 13, 2016 for U.S. Appl. No. 14/193,691".
"Notice of Allowance from USPTO dated Jul. 5, 2016 for U.S. Appl. No. 14/302,706".
"Notice of Allowance from USPTO dated Apr. 11, 2016 for U.S. Appl. No. 13/790,395".
Notice of Allowance from USPTO dated Jul. 21, 2016 for U.S. Appl. No. 14/312,130.

* cited by examiner

METHOD AND SYSTEM FOR MANAGING STORAGE RESERVATION

TECHNICAL FIELD

The present disclosure relates to managing storage reservation at storage devices.

BACKGROUND

A computer network, often simply referred to as a network, is a group of interconnected computers and devices that facilitates communication among users and allows users to share resources. Adapters, switches and other devices are typically used during network communication for reading and writing data at mass storage devices.

Computing devices (or systems) use the mass storage devices to store data. Data centers are commonly used to store large amount of data for computing devices. Different storage options are available for computing devices to store data and retrieve data. For example, direct-attached storage (DAS), network attached storage (NAS) and storage area networks (SANs).

A DAS system typically includes a plurality of storage drives that are directly attached to a computing device (for example, a server) and is accessible via a host bus adapter (HBA). Common protocols used for DAS storage devices are SCSI (Small Computer Systems Interface), ATA (AT attachment), SATA (Serial ATA), SAS (Serial Attached SCSI) and others.

NAS is a file level storage that provides access to a plurality of computing devices. NAS typically uses network file sharing protocols, for example, NFS (Networked File System), CIFS (Common Internet File System) and others for storing and managing data at storage devices.

SAN is a dedicated network that provides access to consolidated, block level data storage. SANs are primarily used to make storage devices, such as disk arrays, tape libraries, and others, accessible to servers so that the devices appear like locally attached devices to an operating system of a computing device. A SAN typically has its own network of storage devices that are generally not accessible through the local area network by other devices. SANs often utilize a Fibre Channel fabric topology, an infrastructure specially designed to handle storage communications. SANs may also use iSCSI (i.e. mapping SCSI over TCP/IP (Transmission Control Protocol/Internet Protocol), Fibre Channel over Ethernet (FCoE), FCP (Fibre Channel over SCSI), Hyper SCSI (i.e. SCSI over Ethernet) and other protocols for storing data at storage devices.

Continuous efforts are being made to better provide access to storage systems and improve how data is stored and retrieved in a network environment having a plurality of computing devices.

BRIEF DESCRIPTION OF THE DRAWINGS

The various present embodiments relating to the management of network elements now will be discussed in detail with an emphasis on highlighting the advantageous features. These novel and non-obvious embodiments are depicted in the accompanying drawings, which are for illustrative purposes only. These drawings include the following figures, in which like numerals indicate like parts.

DETAILED DESCRIPTION

Figure 1A:
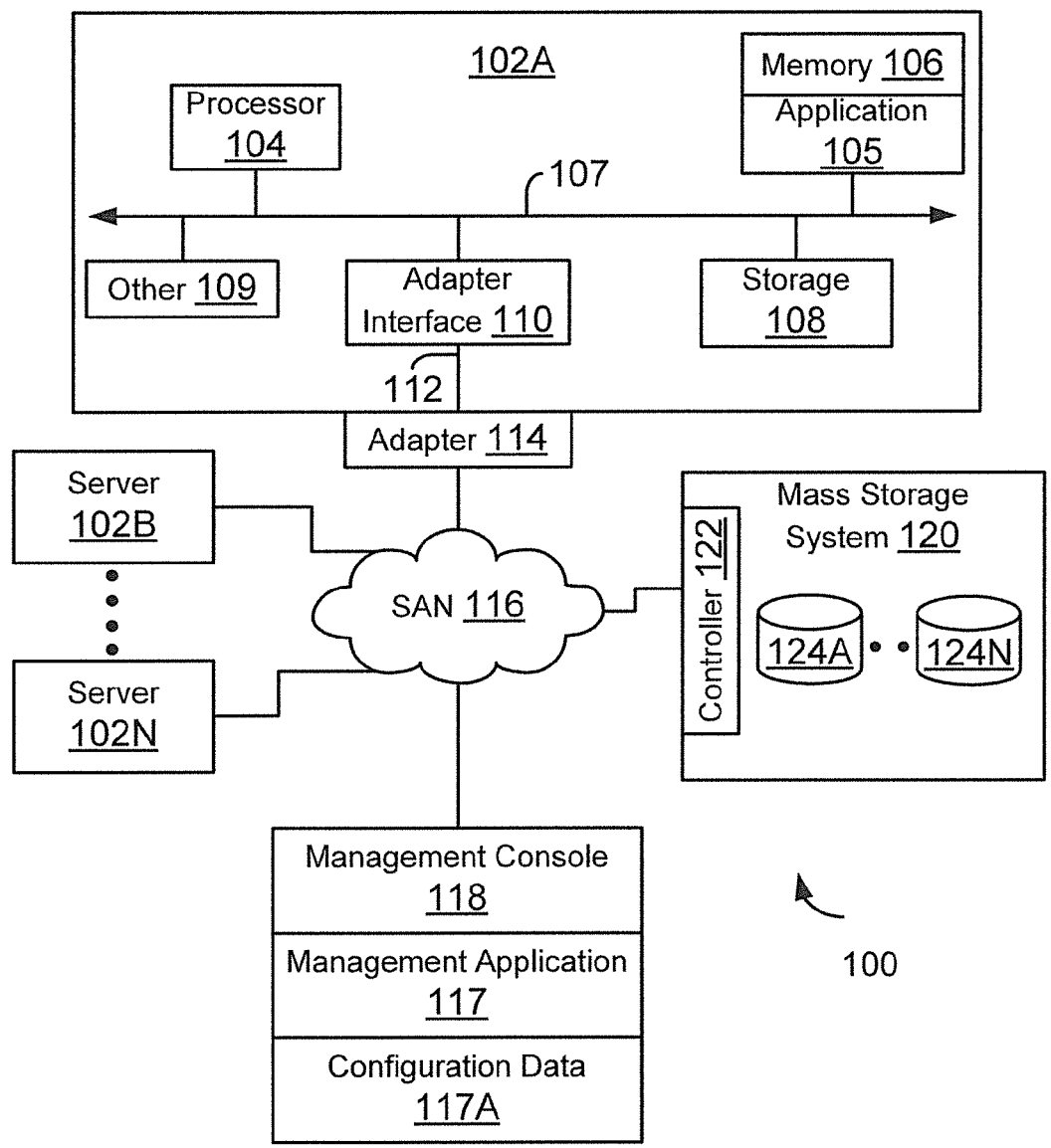
FIG. 1A is a functional block diagram of a system, used according to one embodiment.

The following detailed description describes the present embodiments with reference to the drawings. In the drawings, reference numbers label elements of the present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), manual processing, or a combination of these implementations. The terms "logic," "module," "component," "system," and "functionality," as used herein, generally represent software, firmware, hardware, or a combination of these elements. For instance, in the case of a software implementation, the terms "logic," "module," "component," "layer" "system," and "functionality" represent executable instructions that perform specified tasks when executed on a hardware based processing device or devices (e.g., CPU or CPUs). The program code can be stored in one or more non-transitory, computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations. The term "machine-readable media" and the like refers to any kind of medium for retaining information in any form, including various kinds of storage devices (magnetic, optical, static, etc.).

The embodiments disclosed herein may be implemented as a computer process (method), a computing system, or as an article of manufacture, such as a computer program product or computer-readable media. The computer program product may be non-transitory, computer storage media, readable by a computer device, and encoding a computer program of instructions for executing a computer process. The computer program product may also be readable by a computing system, and encoding a computer program of instructions for executing a computer process.

In one embodiment, an adapter, for example, a network device is provided. The adapter includes a storage protocol controller having a port for interfacing with a storage area network (SAN) based storage device and another adapter operating within a cluster is provided. The adapter includes a processor executing instructions for managing a local storage device that is configured to operate as a caching device for a computing device. The adapter operates as a host bus adapter and a storage controller for managing storage space at the local storage device and the SAN-based storage device.

System 100:

FIG. 1A is a block diagram of a system 100 configured for use with the present embodiments. System 100 may include a plurality of computing systems 102A-102N (may also be referred to as server (s) 102 or host system 102), each coupled to an adapter 114 (also referred to as an intelligent storage adapter (ISA) 114) that interfaces with other devices and ISAs, as described below in more detail.

The computing system 102A may include one or more processors 104, also known as central processing units (CPUs). Processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices.

Processor 104 executes machine implemented instructions (or process steps/blocks) out of a memory 106 and interfaces with an interconnect 107 that may be referred to as a computer bus 107. The computer bus 107 may be, for example, a system bus, a Peripheral Component Interconnect (PCI) bus, PCI-Express (PCIe) bus, a HyperTransport or industry standard architecture (ISA) bus, a SCSI bus, a universal serial bus (USB), an Institute of Electrical and Electronics Engineers (IEEE) standard 1394 bus (sometimes referred to as "Firewire®"), or any other type of bus.

The computing system 102A may further include a storage device 108, which may be for example a hard disk, a CD-ROM, a non-volatile memory device (flash or memory stick) or any other storage device for storing structured or unstructured data. Storage 108 may store operating system program files (or data containers), application program files, for example, email applications, database applications, management applications, and other application files. Some of these files are stored on storage 108 using an installation program. For example, the processor 104 may execute computer-executable process steps of an installation program so that the processor 104 can properly execute the application program.

In one embodiment, storage device 108 may be a solid state storage device (may also be referred to herein as SSD 108). SSDs are becoming popular for servers that may need to store large amounts of data. ISA 114 described below in more detail may be used to manage and/or access storage device 108, according to one embodiment.

Memory 106 also interfaces with the computer bus 107 to provide the processor 104 with access to memory storage. Memory 106 may include random access main memory (RAM). When executing stored computer-executable process steps from storage 108, the processor 104 may store and execute the process steps out of memory 106. Read only memory (ROM, not shown) may also be used to store invariant instruction sequences, such as start-up instruction sequences or basic input/output system (BIOS) sequences for operation of a keyboard (not shown).

In one embodiment, processor 104 may execute an application 105 for performing certain functions. For example, application 105 may be a database application, a virtual machine executed in a virtual environment (provided by VMW are Corporation, Microsoft Corporation or any other entity) electronic email application (for example, Microsoft Exchange) or any other application type. Application 105 may issue read and write requests that are processed by ISA 114, as described below in more detail. Application 105 may also be referred to as a "client".

The computing system 102A also includes other devices and interfaces 109, which may include a display device interface, a keyboard interface, a pointing device interface and others. The details of these components are not germane to the inventive embodiments.

ISA 114 may be configured to handle both network and storage traffic while interfacing with other elements. In one embodiment, as described below in detail, ISA 114 may be configured to provide the functionality of a host bus adapter (HBA) by providing connectivity to SAN (storage area network) based storage arrays as well as present logical storage from a local storage device connected to the ISA. Various network and storage protocols may be used to handle network and storage traffic, for example, Ethernet, Fibre Channel, Fibre Channel over Ethernet (FCoE), Internet over Small Computer System Interface (iSCSI), and others. Some of the common protocols are described below.

Ethernet is a common network protocol used for network communication. The original Ethernet bus or star topology was developed for local area networks (LAN) to transfer data at 10 Mbps (mega bits per second). Newer Ethernet standards (for example, Fast Ethernet (100 Base-T) and Gigabit Ethernet) support data transfer rates that are greater than 1 gigabit (Gb). The various embodiments described herein may use Ethernet (which includes 100 Base-T and/or Gigabit Ethernet) as the network protocol. However, the adaptive embodiments disclosed herein are not limited to any particular protocol, as long as the functional goals are met by an existing or new network protocol.

Fibre Channel (may also be referred to as "FC") is a common storage protocol used in SANs. Fibre Channel is a set of American National Standards Institute (ANSI) standards that provide a serial transmission protocol for storage and network protocols such as HIPPI, SCSI, IP, ATM and others. Fibre Channel supports three different topologies: point-to-point, arbitrated loop and fabric. The point-to-point topology attaches two devices directly. The arbitrated loop topology attaches devices in a loop. The fabric topology attaches host systems directly (via HBAs) to a fabric, which are then connected to multiple devices. The Fibre Channel fabric topology allows several media types to be interconnected. Fibre Channel fabric devices include a node port or "N_Port" that manages Fabric connections. The N_port establishes a connection to a Fabric element (e.g., a switch) having a fabric port or F_port.

A new and upcoming standard, called Fibre Channel over Ethernet (FCOE) has been developed to handle both Ethernet and Fibre Channel traffic in a storage area network (SAN). This functionality would allow Fibre Channel to leverage high speed, for example, 10 Gigabit Ethernet or higher speed networks while preserving the Fibre Channel protocol. In one embodiment, ISA 114 can be configured to operate as a FCOE adapter. Those of ordinary skill in the art will appreciate, however, that the present embodiments are not limited to any particular protocol.

iSCSI is an IP based storage networking standard for linking data storage facilities. By carrying SCSI commands over IP networks, iSCSI is used to facilitate data transfers over intranets and to manage storage over long distances. iSCSI can be used to transmit data over local area networks (LANs), wide area networks (WANs), or the Internet and can enable location-independent data storage and retrieval. The protocol allows clients to send. SCSI commands (referred to as command or (control) data blocks (CDBs) to SCSI storage devices (may be referred to as targets) on remote servers. iSCSI is a SAN-based protocol, allowing organizations to consolidate storage into data center storage arrays while providing hosts (such as database and web servers) with the illusion of locally attached disks. Unlike traditional Fibre Channel, which uses special-purpose cabling, iSCSI can be run over long distances using existing network infrastructure. In one embodiment, ISA 114 may operate as an initiator as well as a target for responding to input/output (referred to as I/O or "IO") requests for reading and writing information at storage devices.

Storage space at a storage device (local or SAN-based) is typically presented to application 105 as a logical entity referred to as a logical unit number (LUN). Each LUN is uniquely identified by an identifier (LUN ID) and is associated with physical storage space. A LUN has a size associated with it that may indicate the amount of storage space that is made available to a computing system and a drive letter that may be used to access the LUN.

A LUN is typically divided into logical block addresses (LBAs) that are used by application 105 to read and write data to storage locations. The LBAs are mapped with actual physical storage to read and write data. A LUN used by an application may be referred to as a data LUN. A LUN that is accessible via a SAN connection may be referred to as a SAN LUN. A LUN at a local storage device managed by ISA 114 may be referred to as "cache" LUN. A cache LUN may be used to cache data stored at a SAN LUN or another data LUN. The cache LUN is managed by ISA 114 and may not be visible to application 105. ISA 114 may also manage a SAN LUN that may presented to one or more clients, as described below in more detail.

Referring back to FIG. 1A, computing system 102 uses an adapter interface 110 to communicate with ISA 114 via a link 112. In one embodiment, link 112 may be a PCI-Express link or any other interconnect type. Adapter interface 110 includes logic and circuitry to send and receive PCI-Express packets. The adaptive embodiments disclosed herein are not limited to any particular link type.

ISA 114 may communicate and interface with a mass storage system 120 via a SAN 116 that may include one or more switch (may be referred to as fabric switch). The mass storage system 120 may include a plurality of storage devices 124A-124N. Storage space at storage devices 124A-124N may be presented as SAN LUNs to application 105 via SAN 116. Controller 122 of mass storage system 120 may be used to manage storage devices 124A-124N. In one embodiment, controller 122 may include a processor, an ISA 114 and other similar components.

System 100 may also include a management console 118, used according to one embodiment. Management console 118 may be a computer system similar to computing system 102A described above in detail. Management console 118 executes a management application 117 that may be used to configure storage space as logical structures (for example, as LUNs) that are presented to computing systems 102A-102N for storing information or as cache LUNs at local storage for caching information stored at SAN LUNs. Permissions associated with a LUN may also be configured using management application 117. The permissions indicate which entities may be allowed to access a LUN to read and/or write information. Management application 117 may store LUN attributes and permissions in a configuration data structure 117A at a storage location.

In one embodiment, ISA 114 is provided that can provide transparent data caching at SSDs while efficiently synchronizing the SSD data with SAN-based storage devices. The ISA enables management of data stored at the SSDs. The ISA also enables the SSDs to be shared as SAN storage allowing other servers 102B-102N to access data residing at SSDs in server 102A. ISA 114 may configure a LUN from the local storage 108 and present the LUN to servers 102A-102N, allowing the local storage 108 to be shared by other servers 102B-102N.

In another embodiment, ISA 114 provides traditional SAN connectivity to computing systems 102A and to the SSDs at each computing system. The SSDs may be managed as a storage pool that may be configured to operate as a cache pool to cache read/write data for SAN LUNs presented to the computing systems. SAN LUNs when configured may be tagged with an attribute that allows caching at the local SSDs for read and/or write caching.

Figure 1B:
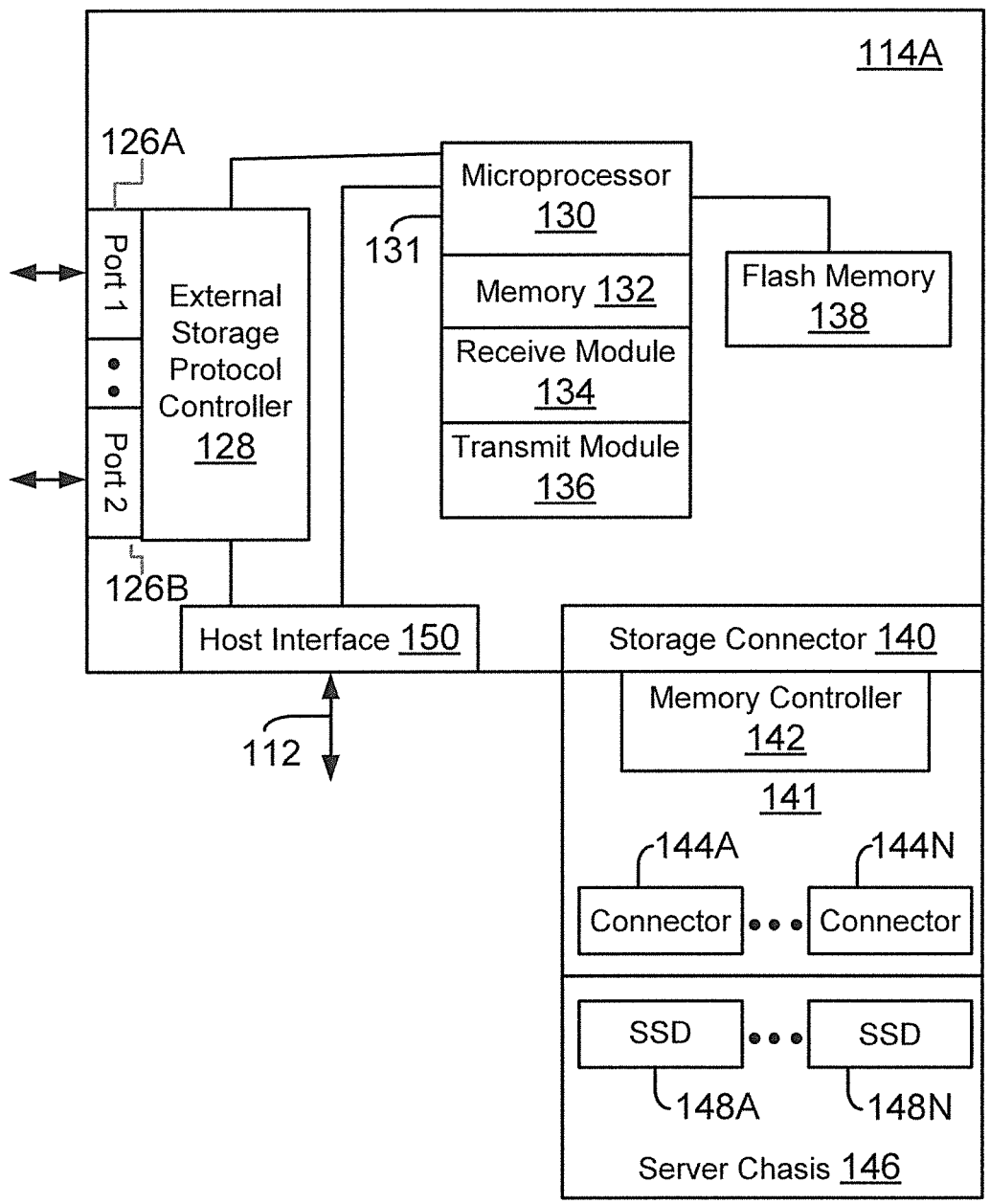
FIG. 1B shows an example of an intelligent storage adapter (ISA)

FIG. 1B shows an example of ISA 114A that includes a storage protocol controller 128 (shown as "external storage protocol controller") with ports 126A and 126B. The storage protocol controller may be a Fibre Channel controller (or application specific integrated circuit (ASIC)) that is available from QLogic Corporation for interfacing with Fibre Channel based storage devices via ports 126A/126B. Ports 126A/126B include logic and circuitry for sending and receiving Fibre Channel frames. Fibre Channel is simply shown as an example and the various embodiments disclosed herein are not limited to any particular storage/network protocol. Thus ports 126A-126B are not limited to just Fibre Channel ports. Furthermore, although only two ports 126A and 126B are shown as an example, the adaptive embodiments disclosed herein are not limited to any particular number of ports.

Storage protocol controller 128 may operate as a host bus adapter for managing I/O requests for SAN-based storage. Storage protocol controller 128 is configured to process I/O requests for reading data from SAN-based storage (124A-124N) and writing data to SAN-based storage. Thus storage protocol controller 128 is used to take advantage of existing SAN infrastructure, while providing access to SSDs for computing systems 102A-102N.

In one embodiment, storage protocol controller 128 includes a processor (not shown) for executing the Fibre Channel stack having layers, FC0-FC3. FC0 is defined by the Fibre Channel specification as the physical layer, which includes cables (fiber optics, twisted-pair), connectors and others. FC1 layer is defined as the data link layer. This layer implements the 8B/10B encoding and decoding of signals. FC2 layer 49C is defined as the network layer. This layer defines the main Fibre Channel framing, addressing, and control protocols. FC3 layer is an auxiliary layer that provides common services like encryption or RAID related. FC4 layer is the protocol mapping layer where other protocols, such as SCSI are encapsulated into an information unit for delivery to FC2 and transmission across a Fibre Channel network. This layer provides flexibility to Fibre Channel as a networking technology compatible with other technologies.

ISA 114A also includes a host interface 150 that interfaces with processor 104 via link 112. The structure of host interface 150 will depend on the type of connection/interconnect used to communicate with processor 104. For example, if a PCI-Express link is used to communicate with processor 104, then host interface 150 includes logic and circuitry for receiving and sending PCI-Express packets/information.

ISA 114A includes a system on chip (SOC) 131 that includes a micro-processor 130 having access to an adapter memory (may also be referred to as local memory) 132. Processor 130 may be one or more programmable general-purpose or special-purpose microprocessors, digital signal processors (DSPs), programmable controllers, application specific integrated circuits (ASICs), reduced instruction set computer (RISC), programmable logic devices (PLDs), or the like, or a combination of such hardware devices. Memory 132 may be used to store firmware instructions and various data structures for ISA 114A for controlling overall ISA 114A operations. Memory 132 may also store instructions for implementing the various embodiments described herein.

SOC 131 may also include a receive module 134 and a transmit module 136. The receive module 134 may be used to store packets that are received via ports 126A/126B, while transmit module 136 may be used to store information that is transmitted via ports 126A/126B or to local SSDs that are described below. Receive module 134 and/or transmit module 136 may be separate modules and may include more than one component for processing received information or information that is transmitted.

ISA 114A may also include a non-volatile memory 138 (shown as flash memory) for storing parameters/instructions that may be used by micro-processor 130 for executing the instructions described below in detail. ISA 114A also includes a storage connector 140 that interfaces with another card 141 (may also be referred to as a daughter card 141), according to one embodiment. In one embodiment, the storage connector may be a PCI-Express connector, PCI connector or any other connector type based on the interconnect type used by SOC 131 to interface with the SSDs. The daughter card 141 includes a memory controller 142 that interfaces with a plurality of connectors' 144A-144N. The plurality of connectors' 144A-144N is used to plug in SSDs 148A-148N (similar to storage 108). In this embodiment, SSDs 148A-148N are included within a server chassis 146. In one embodiment, connectors' 144A-144N may be SATA connectors for receiving SSDs 148A-148N. In another embodiment, connectors' 144A-144N may be SAS connectors.

ISA 114A has SAN connectivity because of ports 126A-126B, similar to a host bus adapter, as mentioned above. The storage protocol controller 128 allows SAN storage based processing. Unlike conventional HBAs, ISA 114A also includes storage connector 140 that provides local storage solutions via SSDs 148A-148N.

In another embodiment of ISA 114A is configured such that a daughter card has the SSDs 148A-148N on the card itself, rather than on the server chassis 146. In another embodiment of ISA 114A is configured such that the memory controller 142 is on the same card as the other components of ISA 114A. The SSDs 148A-148N are also on the same card connected via one or more storage connectors.

Figure 1C:
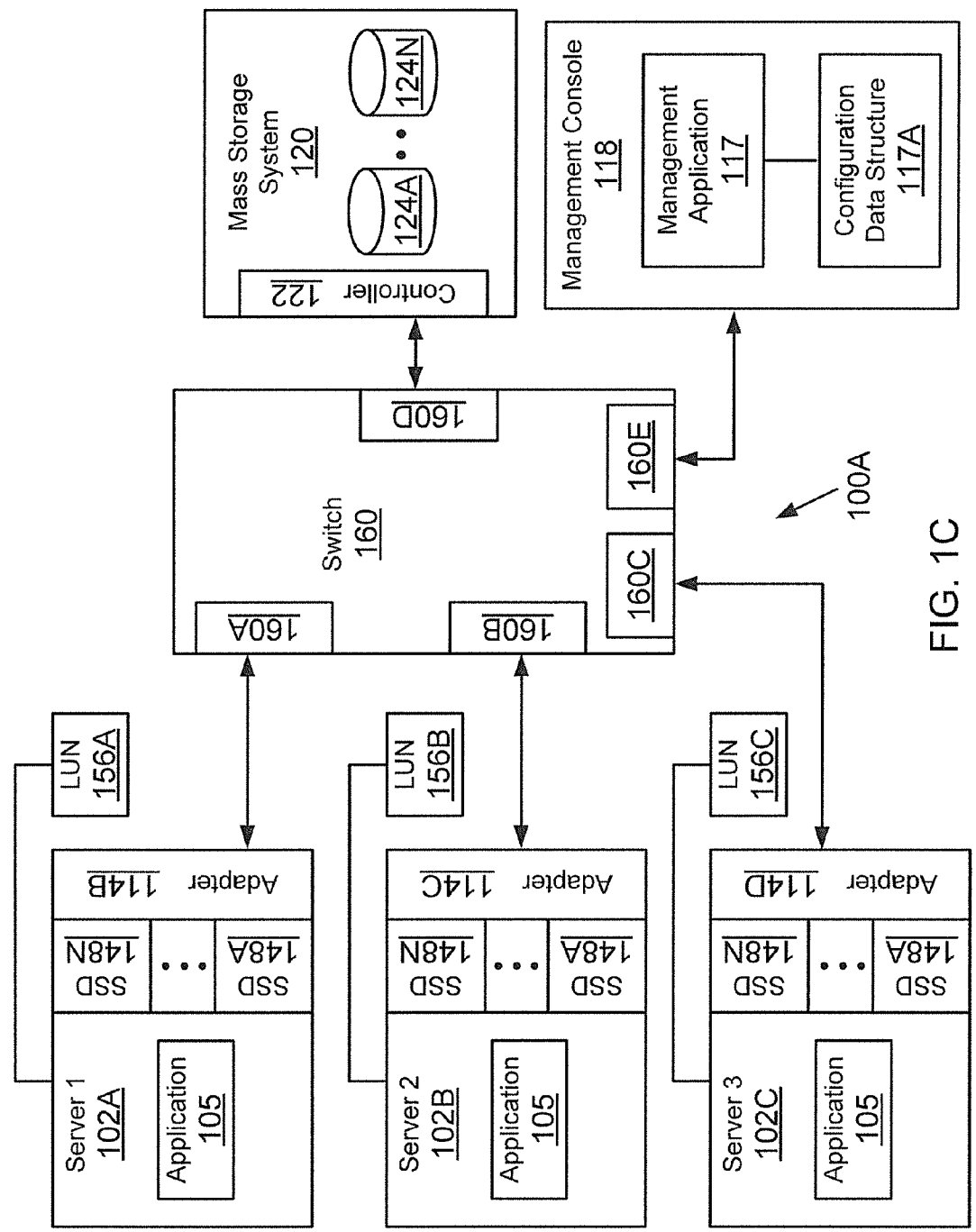
FIG. 1C shows an example of a configuration for using the ISAs, according to one embodiment.

FIG. 1C shows a system 100A where each ISA 114B-114D (similar to ISA 114A described above) in servers 102A-102N (servers 102A-102C are illustrated) are coupled to a fabric switch 160, according to one embodiment. Fabric switch 160 includes a plurality of ports 160A-160E. Ports 160A-160C are coupled to ISA 114B-114D ports, respectively, while port 160D is coupled to controller 122 of the mass storage system 120. Management console 118 may be coupled to port 160E for configuring various components of system 100A.

Management console 118 may also be used to configure LUNs 156A-156N (LUNs 156A-156C are illustrated) that are presented to servers 102A-102N for storing information. The LUNs may be based on storage located at SAN-based storage 120 or at a local SSD 148A-148N.

The LUNs 156A-156N may be configured to operate as a local LUN. In this configuration, the LUN may be used as a "boot" LUN. The LUN may be used by the host computing system to which it is presented. One or more ISAs may present the boot LUN to any of the servers that are served by a cluster of ISAs. LUNs 156A-156N may also be configured as a SAN mirror LUN. In such configuration, the LUN is a mirror of a LUN that is associated with a SAN-based storage device. LUNs 156A-156N may also be configured as Peer Mirror LUN. In such a configuration, the LUN is mirrored across at least two ISAs and hence can be made accessible to at least two servers.

The LUNs 156A-156C may also be accessible by one or more servers via SAN 116. In this example, a DAS (direct attached storage) based SSD becomes accessible as SAN storage, while the DAS based storage is still managed by an application 105 (for example, a database application).

In. FIG. 1C, in one embodiment ISA 114B in server 102A acts as a storage protocol controller for LUN 156A, serving up LUN 156A to initiators ISA 114C in server 102B and ISA 114D in server 102C. At the same time, ISA 114B also acts as a traditional HBA (initiator) for SAN LUNs at SAN storage devices 124A-124N.

Figure 2:
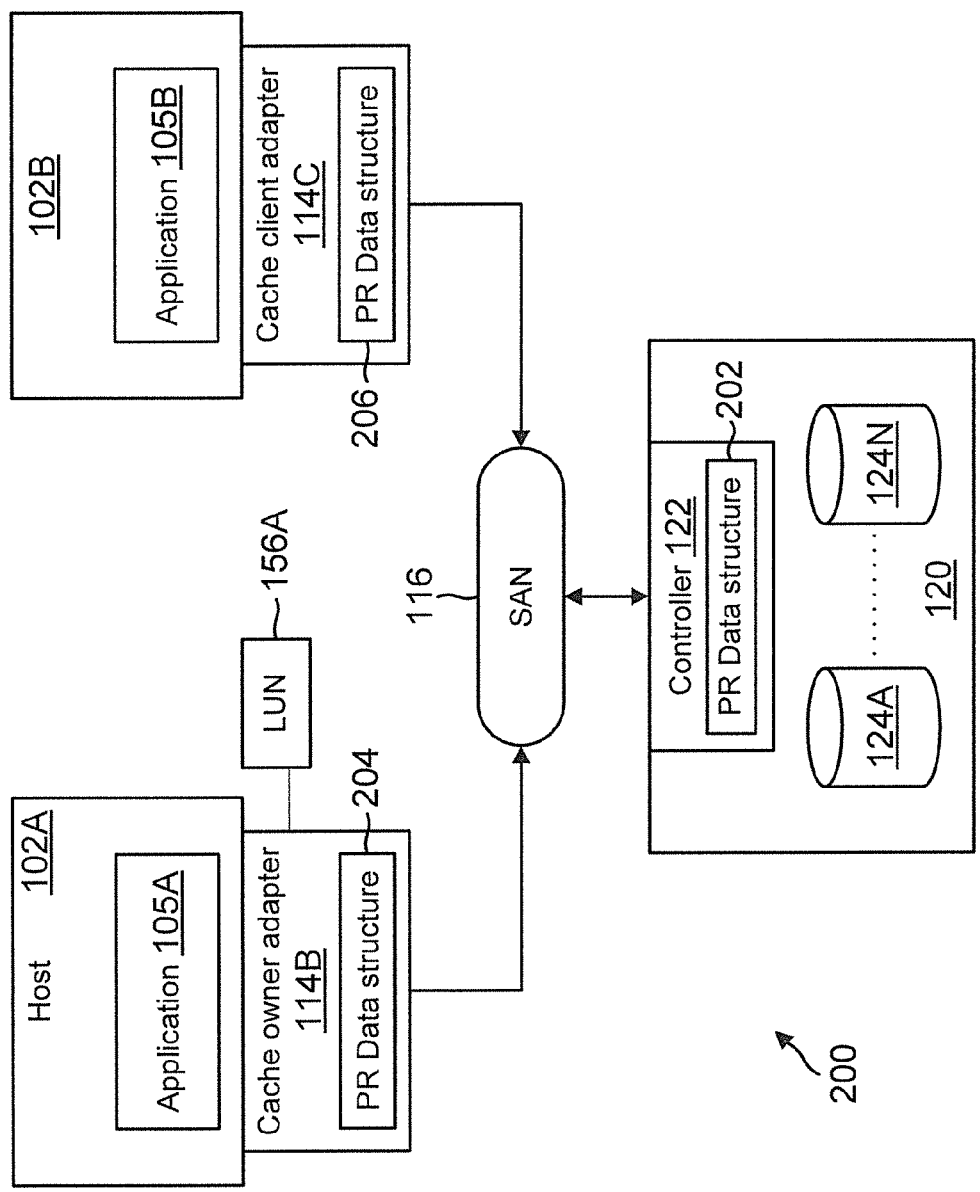
FIG. 2 shows an arrangement of using more than one ISA in a server chassis.

FIG. 2 shows a configuration 200 where LUN 156 (illustrated as 156A) is owned by adapter 114 (shown and referred to herein as cache owner adapter 114B). The LUN may be a SAN LUN that is based on storage space at the storage array 120, accessible via SAN 116.

Adapter 114C is shown and referred to as a cache client adapter because although adapter 114C may be allowed to read and write data at LUN 156A on behalf of application 105B, the LUN itself is owned by cache owner adapter 114B.

To be able to read and write information at LUN 156A, the SCSI standard specifies Persistence Reserve (PR) commands. The PR commands are used to place reservation on LUNs. The reservation allows an application, for example, 105B to read and write information using LUN 156A.

This becomes complex in an environment like system 200, where the physical space for LUN 156A is managed by controller 122, the LUN itself is owned by cache owner adapter 114B and other cache client adapters may request access to the LUNs on half of clients (for example, application 105B).

In one embodiment, various PR data structures 202, 204 and 206 are maintained in system 200. PR data structure 202 is maintained by controller 122 and identifies who at any given time owns a reservation on LUN 156A. For example, when cache owner adapter 114B owns LUN 156A, then PR data structure 202 identifies the cache owner adapter 114B, identifies LUN 156A and the attributes associated with the reservation.

PR data structure 204 is maintained by cache owner adapter 114B, according to one embodiment. Cache owner adapter 114B manages PR requests from cache clients. When application 105B needs a reservation, then cache client adapter 114C sends a PR request to cache owner adapter 114B. If the request is granted, then cache owner adapter 114B updates the PR data structure 204 to identify the application 105B as the entity that has reservation on LUN 156A.

PR data structure 206 is maintained by cache client adapter 114C. PR data structure 206 identifies the application 105B on whose behalf cache client adapter 114C may have requested a PR on LUN 156A. The various processes for handling PR requests and using data structures 202, 204 and 206 are described below with respect to FIGS. 3-5, according to the various aspects disclosed herein.

Figure 3:
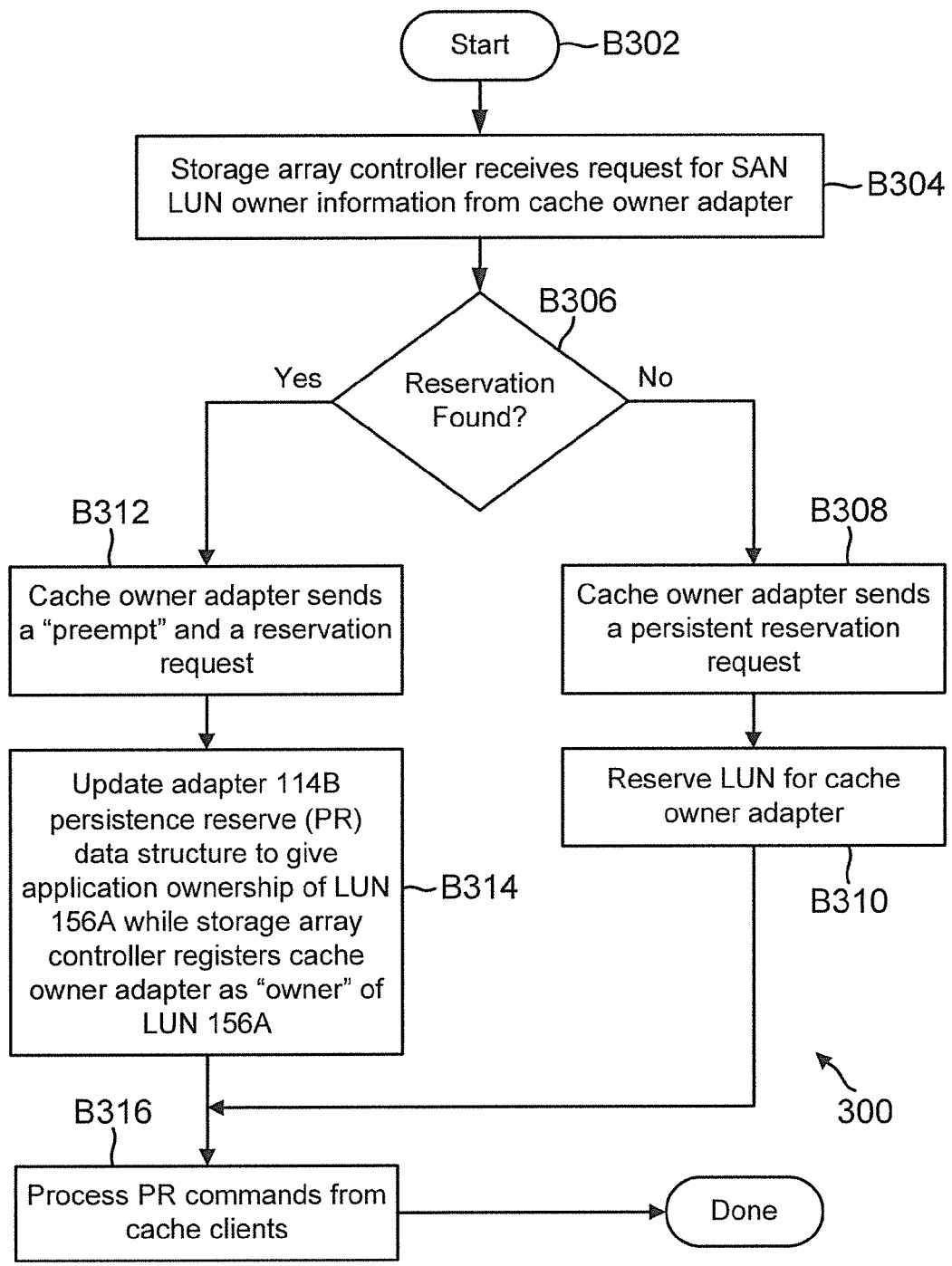
FIGS. 3-5 show process flows according to various embodiments of the present disclosure.

FIG. 3 shows a process 300 for establishing ownership for a cache owner adapter 114B (FIG. 2), according to one embodiment. The process begins in block B302, when host systems 102A and 102B and applications 105A and 105B are initialized. Cache owner adapter 114B and cache client adapter 114C are also initialized. Adapter 114B sends a request to controller 122 for obtaining persistent reservation information for LUN 156A.

In block B304, the controller 122 receives a request for LUN owner information regarding LUN 156A from cache owner adapter 114B. The controller 122 maintains data structure 202 (FIG. 2) that identifies each LUN and identifies the owner of the LUN that may have a reservation on the LUN.

In block B306, the controller 122 searches data structure 202 to determine if there is any reservation on the LUN 156A. If there is no reservation, then in block B308, adapter 114B issues a request to the controller 122 for persistent reservation ownership of LUN 156A using a "cache owner" key. In block B310, the cache owner adapter 114B is registered as the cache owner by the controller 122. Data structure 202 is then updated by controller 122 to reflect the ownership. The LUN is then reserved for the cache owner adapter 114B. The process then moves to block B316 that is described below in detail.

If a reservation is found in block B306, then in block B312, adapter 114B issues a request to the controller 122 to preempt any previous reservation that may be owned based on an application key (e.g. Key_B for application 105B). The controller 122 registers the cache owner adapter 114E as the LUN owner and updates data structure 202.

In block. B314, adapter 114B updates data structure 204 and adds the application that owned the reservation (as determined in block B306) as the owner of LUN 156A.

Thereafter, in block B316, cache owner adapter 114B is able to handle any PR requests from clients, for example, cache client adapter 114C and/or applications executed by the host computing systems. Thereafter, the process ends.

Figure 4:
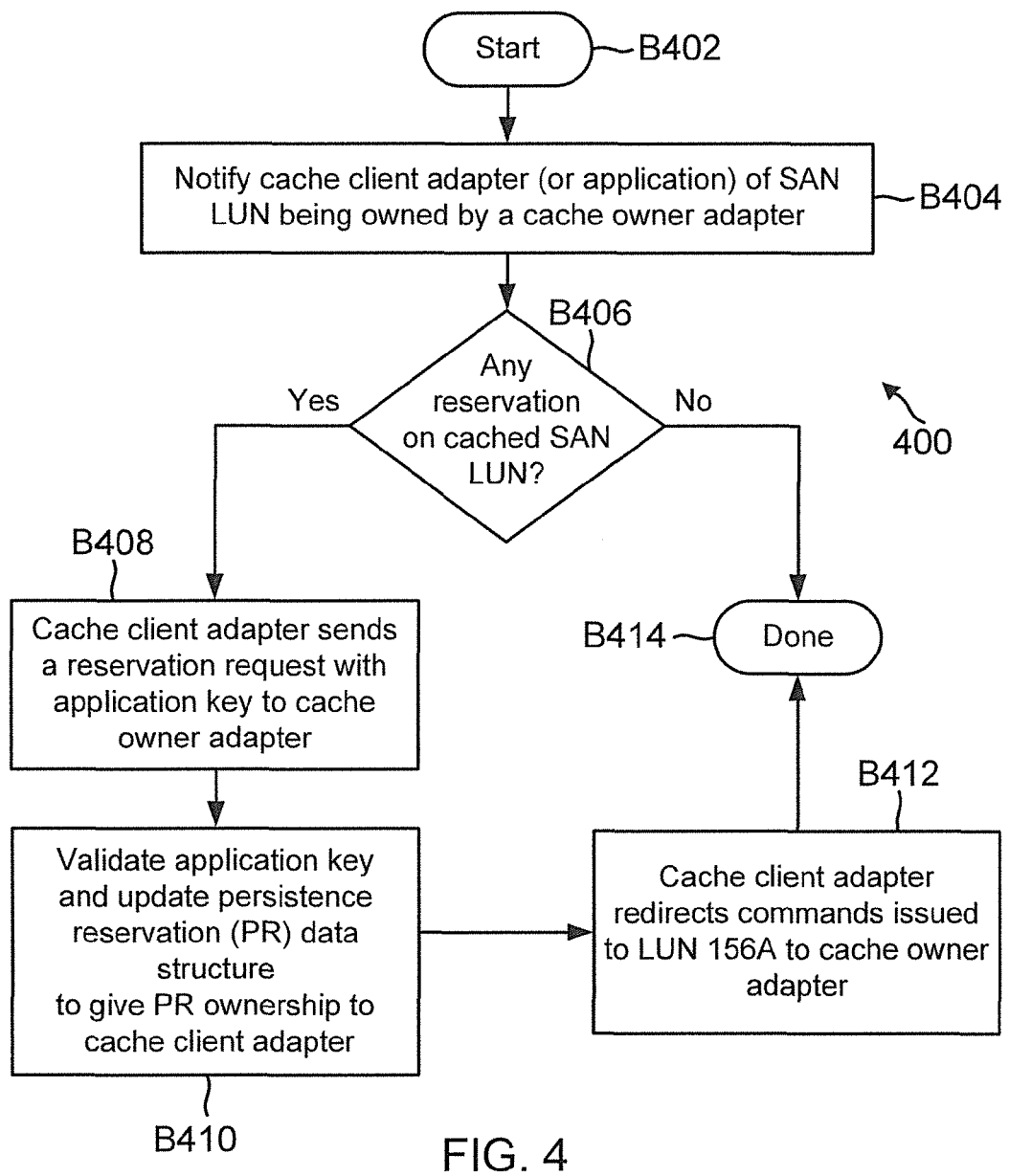

FIG. 4 shows a process 400 for notifying a cache client adapter that a LUN is owned by a cache owner adapter within a cluster, according to one embodiment. The process begins in block B402, when the cache owner adapter 114B has established itself as the LUN owner with the controller 122, as described above with respect to FIG. 3.

In block B404, cache client adapter 114C is notified by the cache owner adapter 114B that LUN 156A is owned by the cache owner adapter 114B. The notification may be sent as a message packet.

In block B406, the cache owner adapter 114B determines if there is any reservation on LUN 156A. As described above, the cache owner adapter 114B maintains the data structure 204 with an identity of all the entities (i.e. applications (e.g. 105B, FIG. 2) executed by host systems (e.g. 102B)) that may own any reservation on the LUN 156A. If there is no reservation, the process ends at block B414.

If there is a reservation, then in block B408, the caching client 114C sends a message to cache owner adapter 114B to request a reservation on LUN 156A. The cache client 1140 also sends an application reservation key to cache owner adapter 114B.

In block B410, the cache owner adapter 114B validates the application key to determine if the application is the rightful owner of the LUN 156A reservation. After validating the application, the cache owner adapter 114E updates the persistence reservation data structure 204 indicating that the application now owns the reservation. In block B412 all commands for LUN 156A from cache client adapter 114C are directed towards cache owner adapter 114B and the process ends in block B414.

Figure 5:
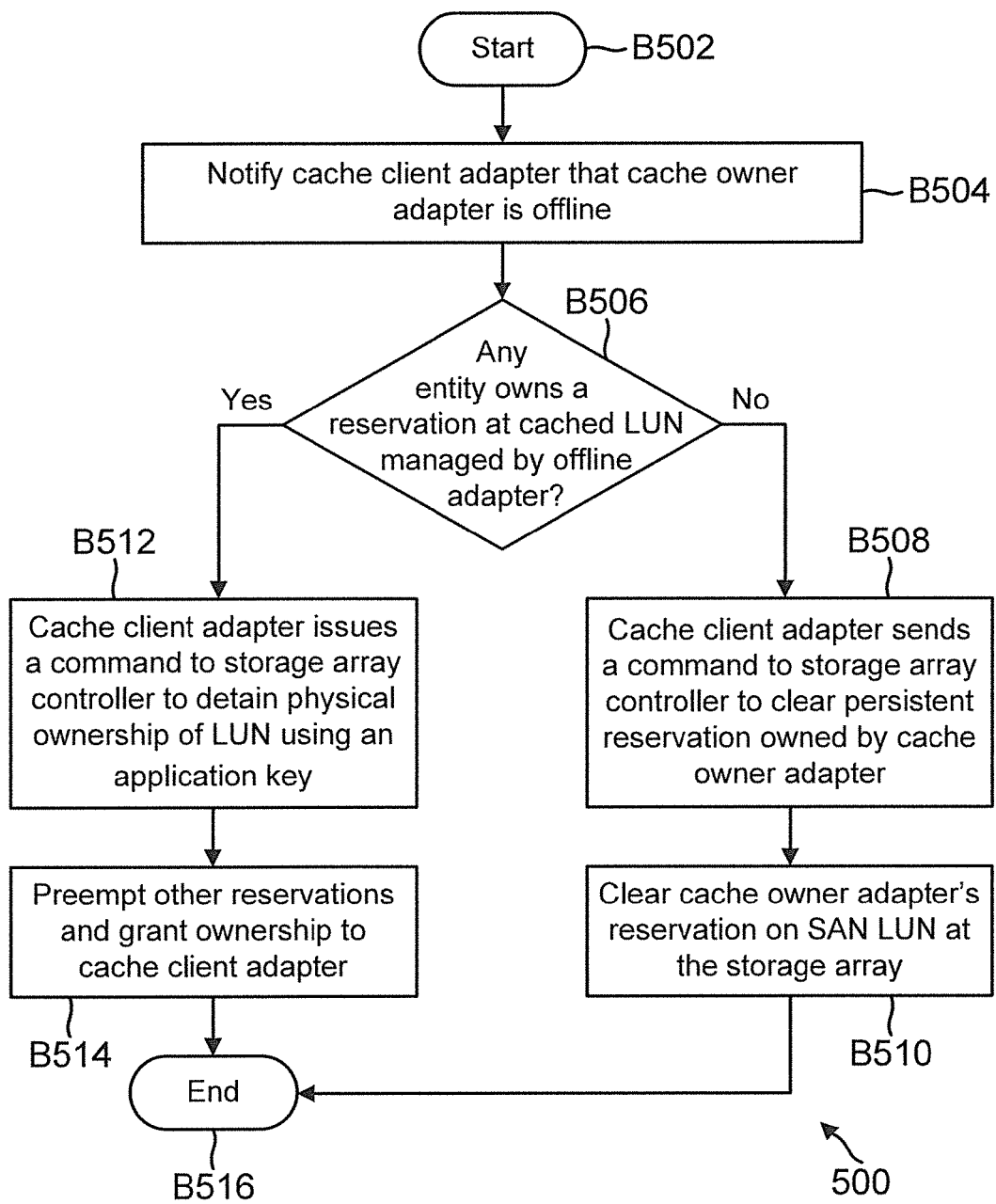

FIG. 5 shows a process 500 for managing PR and I/O requests, when the cache owner adapter 114B goes offline. The process begins in block B502, when cache owner adapter 114B is offline. The cache owner adapter 114B may go offline due to network problems, maintenance or any other reason.

In block B504, the cache client adapter 114C is notified that cache owner adapter 114E is offline. The cache client adapter 114C may be notified using asynchronous notification messages, for example, loop initialization primitives (LIPs provided by the Fibre Channel standards)), RSCN (Registered State Change Notification message per the Fibre Channel standard)) message and others. In one embodiment, cache client adapter 114C may send a polling message to cache owner adapter 114B and when it does not receive a response within a duration, then it can assume that cache owner adapter 114B is offline.

In block B506, cache client adapter 114C determines if any entity (for example, application 105B) owns a reservation at LUN 156A. The cache client adapter 114C maintains the data structure 206 to track all PR requests that are issued and granted on behalf of application 105B or any other application executed by host system 102B.

If there is no reservation, then in block B508, cache client adapter 114C sends a command to the controller 122 to clear the PR owned by cache owner adapter 114B.

In block B510, the controller 122 clears any reservation by the cache owner adapter 114B and instead reserves LUN 156A for application 105B. Data structure 202 is also updated by controller 122.

If there was a reservation for LUN 156A, then in block B512, the cache client 114C sends a command to the controller 122 to request physical preemption of reservation ownership by caching adapter 114B and to register cache client 114C as the physical owner of LUN 156A. In block B514, the controller 122 clears that reservation and registers application 105B's key. The application 105B obtains the reservation on LUN 156A and any other reservation is preempted in block B514. Thereafter, cache client 114C issues I/O and PR commands for LUN 156A directly to controller 122. The process then ends in block B516.

The embodiments described above, allow a cache owner adapter to manage PR requests for SAN LUNs that are physically managed by controller 122 and are available to applications that access the LUN through another adapter. The embodiments also provide an option for handling PR and I/O requests in case the cache owner adapter fails.

Although the present disclosure has been described with reference to specific embodiments, these embodiments are illustrative only and not limiting. For example, although the description above has been described with respect to an ISA, any other device may be configured to perform the foregoing function. Thus the term adapter and device are interchangeable. Many other applications and embodiments of the present disclosure will be apparent in light of this disclosure and the following claims. References throughout this specification to "one embodiment" or "an embodiment" means that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the disclosure, as will be recognized by those of ordinary skill in the art.

What is claimed is:

1. A machine implemented method, comprising:
sending a request by a first adapter coupled to a first computing device for obtaining reservation at a logical storage object that is based on storage space at a storage device of a storage array managed by a controller;
using a first data structure by the controller to determine if there is an existing reservation on the logical storage object;
when there is no existing reservation, granting ownership of the logical storage object to the first adapter by the controller of the storage array; wherein the controller updates the first data structure with a cache owner key indicating that the first adapter owns the logical storage object;
when there is an existing reservation, registering the first adapter as an owner of the logical storage object based on a preemption request from the first adapter for any existing reservation using an application key;
updating a second data structure by the first adapter at a local device of the first adapter indicating that a first application owned the existing reservation;
notifying a second adapter by the first adapter of the granted ownership, the second adapter coupled to a second computing device;
sending a request for reserving the logical storage object by the second adapter to the first adapter, where the second adapter sends the request to the first adapter on behalf of a second application for reading, writing or both reading and writing using the logical storage object owned by the first adapter at the storage device managed by the controller;
validating an application key of the second application by the first adapter;
granting a reservation by the first adapter to the second application; and
the first adapter processing an input/output request sent by the second adapter directly to the first adapter on behalf of the second application for using the logical storage object for reading, writing or both reading and writing information at the storage device.

2. The method of claim 1, wherein the logical storage object is a logical unit number (LUN) that is owned by the first adapter.

3. The method of claim 1, wherein the first adapter and the second adapter operate within a cluster.

4. The method of claim 1, wherein when the first adapter is taken offline, then the second adapter requests the controller to obtain ownership of the logical storage object.

5. The method of claim 4, wherein the second adapter uses a third data structure that tracks reservation requests that are issued and granted on behalf of applications to determine if there is any existing reservation on the logical storage object to request ownership.

6. The method of claim 4, wherein the second adapter after obtaining ownership of the logical storage object issues input/output requests directly to the controller instead of sending input/output requests to the first adapter.

7. The method of claim 1, wherein the first adapter includes a storage protocol controller operating as a host bus adapter for interfacing with the controller and a memory controller for the local device that stores the second data structure and operates as a cache for caching data.

8. A non-transitory, machine readable storage medium, storing executable instructions, which when executed by a machine, causes the machine to perform a method, the method comprising:
sending a request by a first adapter coupled to a first computing device for obtaining reservation at a logical storage object that is based on storage space at a storage device of a storage array managed by a controller;
using a first data structure by the controller to determine if there is an existing reservation on the logical storage object;
when there is no existing reservation, granting ownership of the logical storage object to the first adapter by the controller of the storage array; wherein the controller updates the first data structure with a cache owner key indicating that the first adapter owns the logical storage object;
when there is an existing reservation, registering the first adapter as an owner of the logical storage object based on a preemption request from the first adapter for any existing reservation using an application key;
updating a second data structure by the first adapter at a local device of the first adapter indicating that a first application owned the existing reservation;
notifying a second adapter by the first adapter of the granted ownership, the second adapter coupled to a second computing device;
sending a request for reserving the logical storage object by the second adapter to the first adapter, where the second adapter sends the request to the first adapter on behalf of a second application for reading, writing or both reading and writing using the logical storage object owned by the first adapter at the storage device managed by the controller;
validating an application key of the second application by the first adapter;
granting a reservation by the first adapter to the second application; and
the first adapter processing an input/output request sent by the second adapter directly to the first adapter on behalf of the second application for using the logical storage object for reading, writing or both reading and writing information at the storage device.

9. The storage medium of claim 8, wherein the logical storage object is a logical unit number (LUN) that is owned by the first adapter.

10. The storage medium of claim 8, wherein the first adapter and the second adapter operate within a cluster.

11. The storage medium of claim 8, wherein when the first adapter is taken offline, then the second adapter requests the controller to obtain ownership of the logical storage object.

12. The storage medium of claim 11, wherein the second adapter uses a third data structure that tracks reservation requests that are issued and granted on behalf of applications to determine if there is any existing reservation on the logical storage object to request ownership.

13. The storage medium of claim 8, wherein the second adapter after obtaining ownership of the logical storage object issues input/output requests directly to the controller instead of sending input/output requests to the first adapter.

14. The storage medium of claim 8, wherein the first adapter includes a storage protocol controller operating as a host bus adapter for interfacing with the controller and a memory controller for the local device that stores the second data structure and operates as a cache for caching data.

15. A system, comprising:

a controller of a storage array having a storage device for storing information on behalf of a logical storage object communicating with the first adapter coupled to a first computing device via a network connection; and a second adapter coupled to a second computing device, interfacing with the first adapter;

wherein the first adapter sends a request to the controller for obtaining reservation at the logical storage object and the controller uses a first data structure to determine if there is an existing reservation on the logical storage object; and when there is no existing reservation, the controller grants ownership of the logical storage object to the first adapter and updates the first data structure with a cache owner key indicating that the first adapter owns the logical storage object;

wherein when there is an existing reservation, the first adapter is registered as an owner of the logical storage object based on a preemption request from the first adapter for any existing reservation using an application key; and the first adapter updates a second data structure at a local device of the first adapter indicating that a first application owned the existing reservation; and notifies a second adapter of the granted ownership;

wherein the second adapter sends a request for reserving the logical storage object to the first adapter on behalf of a second application for reading, writing or both reading and writing using the logical storage object owned by the first adapter at the storage device managed by the controller; and the first adapter validates an application key of the second application to grant a reservation to the second application; and wherein the first adapter processes an input/output request sent directly by the second adapter to the first adapter on behalf of the second application for using the logical storage object for reading, writing or both reading and writing information at the storage device.

16. The system of claim 15, wherein the logical storage object is a logical unit number (LUN) that is owned by the first adapter.

17. The system of claim 15, wherein the first adapter and the second adapter operate within a cluster.

18. The system of claim 15, wherein when the first adapter is taken offline, then the second adapter requests the controller to obtain ownership of the logical storage object.

19. The system of claim 18, wherein the second adapter uses a third data structure that tracks reservation requests that are issued and granted on behalf of applications to determine if there is any existing reservation on the logical storage object to request ownership.

20. The system of claim 18, wherein the second adapter after obtaining ownership of the logical storage object issues input/output requests directly to the controller instead of sending input/output requests to the first adapter.

21. The system of claim 18, wherein the first adapter includes a storage protocol controller operating as a host bus adapter for interfacing with the controller and a memory controller for the local device that stores the second data structure and operates as a cache for caching data.

* * * * *

UNITED STATES PATENT AND TRADEMARK OFFICE
CERTIFICATE OF CORRECTION

| | |
|---|---|
| PATENT NO. | : 9,454,305 B1 |
| APPLICATION NO. | : 14/165100 |
| DATED | : September 27, 2016 |
| INVENTOR(S) | : Emralino et al. |

Page 1 of 1

It is certified that error appears in the above-identified patent and that said Letters Patent is hereby corrected as shown below:

In the Specification

In Column 9, Line 28, delete "114E" and insert -- 114B --, therefor.

In Column 9, Line 62, delete "114E" and insert -- 114B --, therefor.

In Column 10, Line 8, delete "114E" and insert -- 114B --, therefor.

Signed and Sealed this
Seventeenth Day of January, 2017

Michelle K. Lee
*Director of the United States Patent and Trademark Office*